UNITED STATES PATENT OFFICE 2,559,247

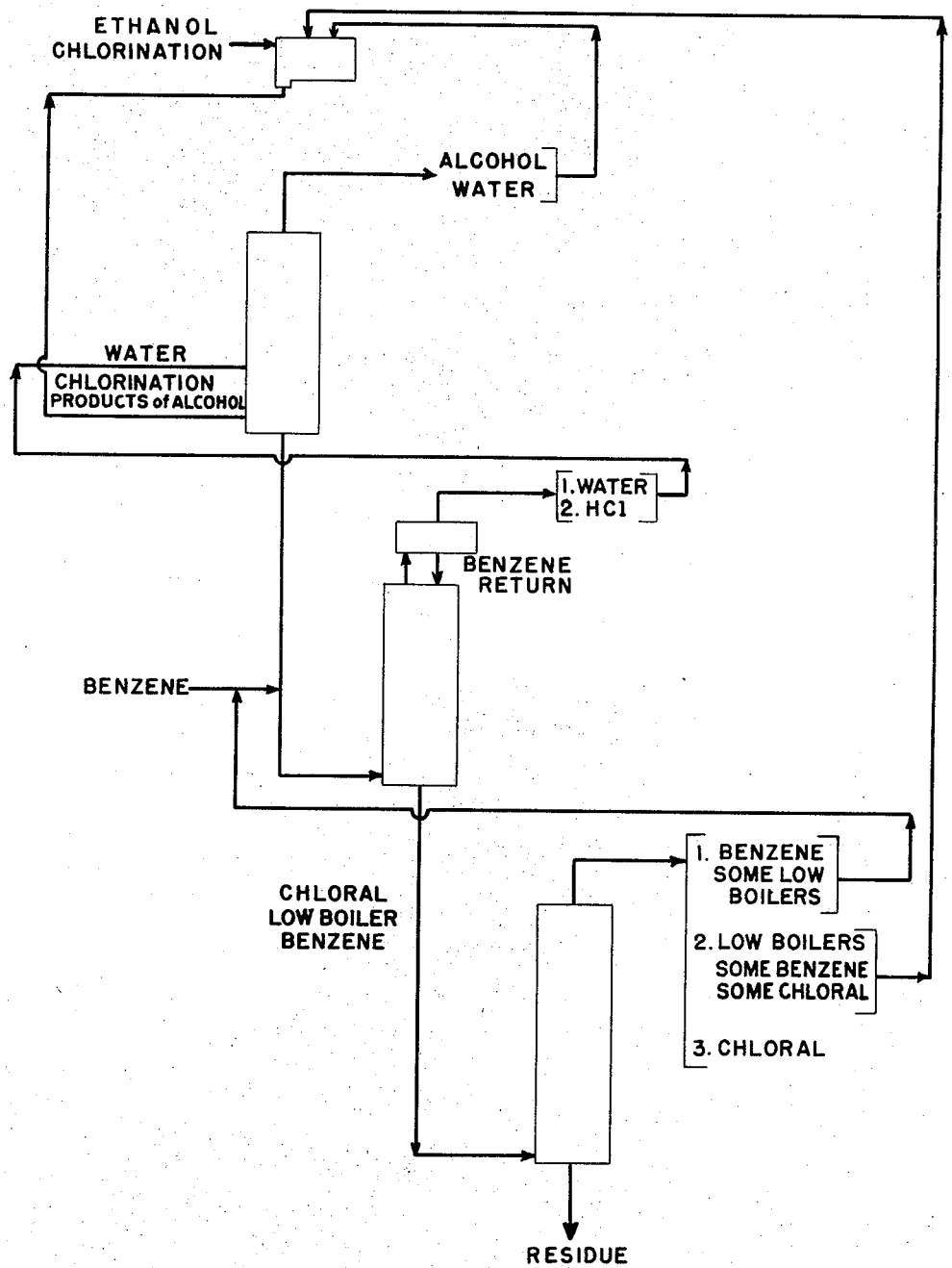

PURIFICATION OF CHLORAL

Max T. Goebel, Rocky River, Ohio, James W. Langston, La Porte, Tex., Donald J. Loder, Wilmington, Del., and Howard T. Siefen, Shaker Heights, Ohio, assignors to E. I. du Pont de Nemours & Company, Wilmington, Del., a corporation of Delaware Application November 12, 1947, Serial No. 785,553

7 Claims. (Cl. 260—601)

This invention relates to the production of chloral, and is more particularly directed to processes in which chlorination products of ethanol are first distilled with water to recover alcohol and are then distilled with benzene to isolate various fractions of value and especially to recover chloral.

Chloral is ordinarily prepared by a process which consists essentially of chlorinating ethanol and then distilling the products of chlorination with sulfuric acid to isolate chloral. This process is subject to a number of disadvantages. For instance, the chlorination products of ethanol contain considerable amounts of ethanol combined with the chloral and these ethanol values are lost by the processes customarily used. There is a considerable loss also of chloral when this prior art process is used in large-scale commercial production. There is moreover the problem of disposing of relatively large quantities of waste sulfuric acids.

In the attached drawing there is diagrammatically illustrated a typical process of the present invention.

It is an object of this invention to provide processes for the preparation of chloral in a manner which will avoid the formation of sulfuric acid wastes. It is a further object to provide processes by means of which chloral may be recovered from the chlorination products of ethanol in good quality and yield. It is a still further object to provide processes which effect substantial economies in alcohol consumption by recovering substantial quantities of the alcohol which is ordinarily lost. Still further objects will become apparent hereinafter.

The foregoing and other objects are attained by processes in which the chlorination products of ethanol are first distilled with a large excess of water to recover an alcohol-water mixture; benzene is then added to the residue and water is azeotropically removed; and finally various fractions of value, including chloral, are isolated by fractional distillation.

Processes of the invention may be most easily understood by reference to the specific embodiment shown in the drawings, and the steps there illustrated will first be discussed in their normal sequence.

Ethanol is chlorinated in any of the various manners already known in the art to produce a mixture of products of chlorination of ethanol. This mixture ordinarily contains chloral, chloral hydrate, some water, a small amount of hydrochloric acid, some chloral acetal

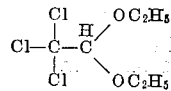

chloral hemiacetal or so-called chloral alcoholate

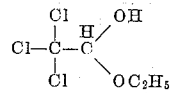

The product also contains underchlorinated materials such as monochloroacetaldehyde and dichloroacetaldehyde and their alcohol reaction products. Benzene is often present in the alcohol as a denaturing agent and if that is so, there will be formed various chlorinated benzenes which will also be present in the product. There will also be present minor amounts of other materials such as chloroform.

A product of the chlorination of ethanol of the type just described may be treated immediately according to the invention or, if preferred, the product may first be given some preliminary treatment or purification. Many of the advantages of the present invention will be attained with any product which contains either chloral or chloral hydrate or both, and which additionally contains reaction products of ethanol with them. A process of the invention may similarly be used with advantage with any product which contains chloral acetals. This will be evident hereinafter since the processes of the invention serve to recover alcohol values from the acetals as well as to recover chloral.

Instead of using the chlorination products of ethanol as they come from a chlorinator, one may advantageously subject these products to a preliminary distillation. They may, for instance, be distilled to separate part or as much as possible of the chloral from the acetals. The acetals thus separated by distillation may then be treated according to processes of the invention.

As a first step in processes of the invention, water is added to the chloral acetals or mixture containing them. The mixture of water and acetals is then subjected to distillation. It may be observed that the mixture may be held at a temperature somewhat below that at which alcohol distills over to assist hydrolysis but no advantage results from such a procedure. The hydrolysis actually need not be conducted as a separate step, for immediately upon distillation alcohol and water are removed from the system. Acid will usually be present in the acetal solutions but, if not, a small amount of an acid such as hydrochloric or sulfuric may be added before the distillation.

It is important that a relatively large amount of water be used, and a maximum alcohol recovery is most easily attained when the quantity of water is fifteen times that theoretically required to hydrolyze the acetals. If a smaller amount of water is used, the alcohol recovery is proportionately less effective until when about three times the theoretical quantity is employed there is substantially no recovery of alcohol. It will be seen that one may use, say, eight or nine times the amount of water theoretically required with some sacrifice but ordinarily it will be desired to use the full fifteen times the theoretical amount of water. In computing the amount of water needed, account should be taken of that present in the chlorination products of ethanol or other crude being treated.

Again it is to be observed that larger amounts of water can be used but this will simply mean that larger quantities of water will need to be handled. There is no other particular disadvantage to the use of larger amounts of water.

The distillation is conducted in accordance with well-recognized practices in the art insofar as the design of distillation equipment and the return of a reflux is concerned. There may be used a plate column or bubble-cap column of the usual sort, or any other suitable distillation equipment may be used. The product of distillation in this stage is an azeotrope of alcohol and water. Additionally, there will be present a small amount of low-boiling materials if the chlorination products of ethanol are used as a starting material. The low-boiling material is composed largely of underchlorinated materials and chloroform.

The distillation will ordinarily be started with a reflux ratio of, say, about 8:1 and this will gradually be increased until at the end of the removal of alcohol the ratio will be about 30:1. In actual practice the reflux ratio will be varied by the operator regulating a valve from time to time to increase the ratio, and in accordance with usual distillation practices the ratio will be held approximately, rather than precisely, at the limits stated.

The product obtained by distillation in this first step can advantageously be returned to the chlorination of ethanol as is illustrated in the drawing. In this manner the alcohol values are recovered and, of course, some of the underchlorinated material is also recovered.

The residue from the distillation is run to a second distillation column, as illustrated in the drawing, and benzene is added to the residue. In commercial practice it will, of course, not be necessary to use separate columns because the distillation which is about to be described can obviously be conducted in the first column unless the greater capacity which results from the use of more columns is desired.

The distillation with benzene is conducted in such a manner that the distillate is at once condensed and, of course, the benzene and water mixture which distills off separates into phases. The water phase can be returned and added to the chlorination products of ethanol which are to be distilled in the first step of the processes of the invention. The benzene can be at once returned to the column.

The amount of benzene required is far less than that theoretically required to form a benzene-water azeotrope. The azeotrope contains about 9% of water. It will be seen that since the benzene is at once returned, only enough benzene is required to form an azeotrope with water under the particular conditions of distillation. This, of course, will depend upon the specific column design and more or less will be needed in different cases to be sure that there is enough benzene present to form the azeotrope at the rate at which the azeotrope is removed in the distillation step.

Towards the end of this distillation step, hydrochloric acid will be recovered. This will be recovered as about 5–15% solution of hydrochloric acid in water and this solution may be used in various of the applications for hydrochloric acid which is contaminated with small amounts of organic impurities.

It will be evident that the selection of a reflux ratio and the specific conditions of distillation can be varied by one skilled in the art, depending upon the specific equipment employed and depending upon the specific size of the equipment.

The residue from the distillation just described is illustrated in the drawing as passing to a third distillation column. Here again it will be evident that the distillation may be effected in the same column as the first two distillations which have already been described. Alternatively, two columns may be used instead of three but this will be evident from a description of the process.

In the third distillation illustrated, benzene and some low-boiling materials will first come over. The benzene fraction then is returned for addition to the residue from the first distillation. The second fraction from this third distillation is composed largely of low-boiling materials and chloral with relatively small amounts of benzene. This fraction may advantageously be returned to the ethanol chlorination step.

Finally, as a third fraction, chloral will be obtained. Chloral thus prepared is of excellent quality and the yield is high.

The reflux ratio in this distillation, as in the first, will begin rather low and will be increased in each temperature range to recover the desired fraction.

After the alcohol is removed in the first distillation, the chloral can be worked-up with sulfuric acid in conventional fashion instead of by distillation with benzene.

In order that the invention may be better understood, reference should be had to the following illustrative example.

*Example*

To 100 parts by weight of chlorination products of ethanol having a specific gravity of 1.56 and a total chlorine content of 59.5 was added 46 parts by weight of water. The mixture was fractionated with a column having nine theoretical plates. The distillation was begun with a reflux ratio of 8:1. This ratio was increased during the distillation and a final ratio of 30:1 was used. Six per cent by weight of alcohol fraction, based on the weight of chlorination products initially used, was recovered. The total amount of water equals about 15 times that theoretically required for hydrolysis of acetals.

To the still residue there was then added 10 parts by weight of benzene. The resulting mixture was fractionally distilled thru the same column using a separator head in which the effluent vapors were condensed. The separator head allowed the lower water layer which was formed from the distillate to be removed from the system while the upper layer was returned to the top of the distillation column.

When water ceased to separate from the distillate, fractional distillation was then continued under a reflux of 15:1 at the start. This reflux ratio was increased slowly and the distillation of this fraction was concluded at a reflux ratio of 30:1. Benzene and low-boiling materials were removed in this distillation and the distillation was continued until the temperature at the top of the column reached 85° C. At this point the distillate contained only a small amount of benzene. The recovered benzene fraction was saved for addition to the next batch of residue from the first distillation. (Note above that the water from the second distillation was returned to the first.)

Distillation was continued to recover low-boiling materials, probably including dichloroacetaldehyde, along with some benzene and chloral in the boiling range of 85 to 95° C. at 760 mm. This distillation was conducted with a reflux ratio of 30:1. The fraction was returned to the chlorination of alcohol step.

Distillation was then continued with a reflux ratio starting at 2:1 and ending at 5:1 to recover a refined chloral boiling at 95 to 100° C.

The yield of refined chloral was 64% on the weight of the chlorination products of ethanol used. It had a chlorine content of 71% and contained less than 0.2% water. When used in the manufacture of DDT it gave a 92% yield with a set point of 90° C.

We claim:

1. In a process for the recovery of chloral the steps comprising adding water to a chloral acetal, distilling to separate an alcohol-water azeotrope therefrom, then recovering chloral from the residue.

2. In a process for the recovery of chloral the steps comprising adding water to chlorination products of ethanol and distilling to separate an alcohol-water azeotrope therefrom.

3. In a process for the recovery of chloral from chloral acetals the steps comprising adding water to an acetal, distilling to separate alcohol therefrom, adding benzene to the residue, then distilling to separate a water-benzene azeotrope, and finally recovering chloral by fractional distillation.

4. In a process for the recovery of chloral from chloral acetals the steps comprising adding at least about 15 times the amount of water theoretically required to hydrolyze the acetals, and distilling an alcohol-water azeotrope from the mixture.

5. In a process for the recovery of chloral from chloral acetals the steps comprising adding at least about 15 times the quantity of water theoretically required to hydrolyze the acetals, fractionally distilling to remove an alcohol-water azeotrope, adding benzene to the residue, removing water therefrom as a benzene-water azeotrope, then fractionally distilling the residue to recover chloral therefrom.

6. In a process for the recovery of chloral from chlorination products of ethanol the steps comprising adding at least about 15 times the amount of water theoretically required to hydrolyze compounds in said chlorination products which contain combined ethanol, distilling the mixture to remove the alcohol as an alcohol-water azeotrope, returning said alcohol-water azeotrope to the chlorination of ethanol step, adding benzene to the residue at the rate required during distillation to remove water as a benzene-water azeotrope, condensing the azeotrope and allowing phase separation, and returning the benzene to the distillation step, and the water phase to the first described distillation, fractionating the residue from the distillation with benzene to produce first a fraction high in benzene which is returned to the second described distillation step, next removing a fraction of low-boiling chlorination products of ethanol together with some benzene and returning this fraction to the chlorination of ethanol, and finally removing a chloral fraction as the product of the process.

7. In a process for the recovery of chloral from chlorination products of ethanol, the steps comprising adding at least eight times the amount of water theoretically required to hydrolyze the acetals present, and distilling an alcohol-water azeotrope from the mixture.

MAX T. GOEBEL.
JAMES W. LANGSTON.
DONALD J. LODER.
HOWARD T. SIEFEN.

REFERENCES CITED

The following references are of record in the file of this patent:

UNITED STATES PATENTS

| Number | Name | Date |
| --- | --- | --- |
| 2,478,741 | Brothman | Aug. 9, 1949 |

OTHER REFERENCES

Callaham: "Chem. & Met.," vol. 51 (1944), pages 109 to 114, particularly page 113.